United States Patent [19]
Yu et al.

[11] Patent Number: 5,880,902
[45] Date of Patent: Mar. 9, 1999

[54] METHOD AND APPARATUS FOR ADAPTIVELY CALIBRATING DISK DRIVE PERFORMANCE BASED ON REAL TIME PERFORMANCE MONITORING

[75] Inventors: Mantle M. Yu; Brooke McGreer, both of San Jose, Calif.

[73] Assignee: International Business Machines Corporation, Armonk, N.Y.

[21] Appl. No.: 629,659

[22] Filed: Apr. 9, 1996

[51] Int. Cl.[6] .............................. G11B 5/596; G11B 5/55
[52] U.S. Cl. .................................. 360/77.04; 360/78.04; 360/78.07
[58] Field of Search ..................... 360/75, 77.02, 360/77.04, 78.08, 78.04, 78.07, 78.09

[56] References Cited

U.S. PATENT DOCUMENTS

| | | |
|---|---|---|
| 4,412,165 | 10/1983 | Case et al. . |
| 4,524,398 | 6/1985 | Fujiki . |
| 4,616,276 | 10/1986 | Workman .............................. 360/77.04 |
| 4,788,608 | 11/1988 | Tsujisawa .............................. 360/77.04 |
| 4,907,212 | 3/1990 | Pharris et al. . |
| 5,185,681 | 2/1993 | Volz et al. . |
| 5,220,546 | 6/1993 | Fennema . |
| 5,251,194 | 10/1993 | Yoshimoto et al. . |
| 5,262,907 | 11/1993 | Duffy et al. . |
| 5,287,234 | 2/1994 | Suzuki . |
| 5,305,161 | 4/1994 | Giovanetti et al. . |
| 5,333,083 | 7/1994 | Nakano . |
| 5,345,348 | 9/1994 | Suzuki . |
| 5,383,068 | 1/1995 | Shimizu et al. . |
| 5,424,885 | 6/1995 | McKenzie et al. .............. 360/77.04 X |
| 5,444,583 | 8/1995 | Ehrilch et al. ....................... 360/78.09 |
| 5,450,383 | 9/1995 | Call et al. . |
| 5,539,714 | 7/1996 | Andrews, Jr. et al. .......... 360/77.04 X |
| 5,550,685 | 8/1996 | Drouin .................................. 360/77.08 |
| 5,657,179 | 8/1997 | McKenzie ............................. 360/78.06 |
| 5,668,680 | 9/1997 | Tremaine .............................. 360/78.07 |
| 5,696,647 | 12/1997 | Phan et al. ........................... 360/78.07 |

*Primary Examiner*—Aristotelis M. Psitos
*Assistant Examiner*—James L. Habermehl
*Attorney, Agent, or Firm*—Merchant, Gould, Smith, Edell, Welter & Schmidt, P.A.

[57] ABSTRACT

An adaptive technique for calibrating a disk drive based on real time measurements. The invention includes a sensor for measuring a performance characteristics of a disk drive, a control circuit for comparing the measured performance characteristics to reference characteristics, and memory for storing performance parameters. The performance parameters are updated when the measured performance characteristics differs from the reference characteristic by a predetermined value, and the processor performs drive operations in accordance with the updated performance parameters. In the specific embodiments, the performance characteristic include disk runout and seek settle performance. A calibration flag may be set in the interface processor in response to the comparison of the measured performance characteristics to reference characteristics. An interrupt flag may be set for interrupting the calibrating of the runout performance when a demand for data is received by the drive, and a calibration command may be issued, e.g., to a servo controller, in response to the setting of the calibration flag. In response to the comparison of the measured performance parameters, the seek velocity may be decreased if the seek settle performance is worse than a minimum seek settle reference value and increased if the seek settle performance is better than a maximum seek settle reference value.

44 Claims, 5 Drawing Sheets

METHOD AND APPARATUS FOR ADAPTIVELY CALIBRATING DISK DRIVE PERFORMANCE BASED ON REAL TIME PERFORMANCE MONITORING

BACKGROUND OF THE INVENTION

1. Field of the Invention

This invention relates in general to a method and apparatus for calibrating disk drives, and more particularly, to a method and apparatus for adaptively calibrating disk drive performance based on real time performance monitoring.

2. Description of Related Art

Over the past several years, most hard drive manufacturers have migrated from purely analog recording technology to drives that use digital electronics. This new technology includes digital read channels which have at least doubled the amount of information that can be packed into an area on a hard drive platter. Further advances have produced even greater improvements in density. For example, read channels implementing partial-response maximum-likelihood digital signal processing allow greater data density by enabling the disk drive to filter out the noise associated with densely packed data. One such example is U.S. Pat. No. 5,220,466, issued to Coker et al., entitled "METHOD AND APPARATUS FOR DIGITAL FILTER CONTROL IN A PARTIAL RESPONSE MAXIMUM-LIKELIHOOD DISK DRIVE SYSTEM", assigned to the assignee of this application, and incorporated by reference herein, which discloses controlling a digital filter function included in a data path within gain and timing control loops of a PRML magnetic recording channel. Such improvements in density are necessary as desktop machines move to applications that employ such rich data types as voice and video.

One application which employs rich data types such as voice and video data is video-on-demand. Video on Demand (VoD) is an interactive multimedia system that works like cable television, except that the customer can select a movie from a large video database. Individual customers in an area are therefore able to watch different programs when they wish to, making the system a realization of the video rental shop brought into the home.

The customer can call on a range of services from video-on-demand applications. While watching movies on television, performing operations such as video selection, pause, rewinding, etc., can be selected as if using a video player. Typically, these commands are processed by the set-top-box and sent to the local server. The local server processes the request if possible. Otherwise, it relays the request to a video archive server.

Digital video/audio information can be compressed and stored on hard disk and advertised for users on the network. Multiple archive servers can simultaneously be running over the same network, depending on the bandwidth available. Implementing a cost-effective and efficient video server is one of the most demanding engineering hurdles to be overcome. Such a server should have the capacity to hold hundreds of Gigabytes (or perhaps Terabytes) of digital information and provide simultaneous access to several hundreds (or thousands) of subscribers in real-time, giving each one an appropriate bandwidth (usually on the order of 1.5–6 megabits per second (Mbps)).

The storage subsystem consists of control units, disk storage and an access mechanism. There are several techniques for increasing the performance by interleaving the digital data of a program on multiple disks. For example, striping involves interleaving portions of disk blocks on multiple disk drives. The aim here is to reduce the latency for block access by parallel reading of the complete block, while attaining high data reliability. Declustering, on the other hand, distributes blocks of files on several disks within the same disk drive, thus allowing parallel block access from the same file and increasing the rate of the video stream. The overall performance can also be enhanced by replicating files among the servers by considering the demand for a program, relative dispersion of subscribers and the access patterns (eg., time/day of peak access, average number of simultaneous viewers, etc.).

Nevertheless, the disk drives of these video servers require extensive calibration to meet the demands of the video-on-demand environment. However, since the interruption of the data stream to perform such functions is undesirable, normal calibration techniques present unique problems. For example, current files require periodic calibration due to thermal changes and other factors. This limit prevents the file from meeting the video-on-demand specification. Currently, video-on-demand users have to disable the periodic calibration function to meet the constant data stream demand of video-on-demand. Due to the lack of thermal calibration, however, file performance will be significantly degraded.

Further, current files have to be designed to function under extreme ends of environmental variations. Power supply and temperature changes are just two examples. To accommodate these changes, additional design compromises have to be made. Yet it is important that system performance is not interrupted or degraded by calibration operations.

It can be seen then that there is a need for a method and apparatus for adaptively calibrating disk drive performance based on real time performance monitoring.

SUMMARY OF THE INVENTION

To overcome the limitations in the prior art described above, and to overcome other limitations that will become apparent upon reading and understanding the present specification, the present invention discloses a technique for enhancing performance of a data storage system.

The present invention solves the above-described problems by providing an adaptive technique for calibrating a disk drive based on real time measurements.

A system in accordance with the principles of the present invention includes a sensor for measuring performance characteristics of a disk drive, a control circuit for comparing the measured performance characteristics to reference characteristics, and memory for storing performance parameters. The performance parameters are set in response to the comparison, and the control circuit performs drive operations in accordance with the set performance parameters.

One aspect of the present invention is that the performance characteristic comprises disk runout.

Another aspect of the present invention is that a calibration flag is set in the processor in response to the comparison of the measured performance characteristics to reference characteristics.

Another aspect of the present invention is that the drive operations comprise calibrating the disk runout during idle time.

Another aspect of the present invention is that an interrupt flag in a processor may be set for interrupting the calibration of the runout performance when a demand for data is received by the processor.

Another aspect of the present invention is that the processor may issue a calibration command to a servo controller in response to the setting of the calibration flag.

Yet another aspect of the present invention is that the performance characteristic comprises seek settle performance.

Another aspect of the present invention is that the performance parameters stored in the memory comprise a seek velocity, the seek velocity being adjusted in response to the comparison.

Still another aspect of the present invention is that the seek velocity is decreased if the seek settle performance is worse than a minimum seek settle reference value and increased if the seek settle performance is better than a maximum seek settle reference value.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for adaptively calibrating disk drive performance based on real time performance monitoring.

Figure 1:
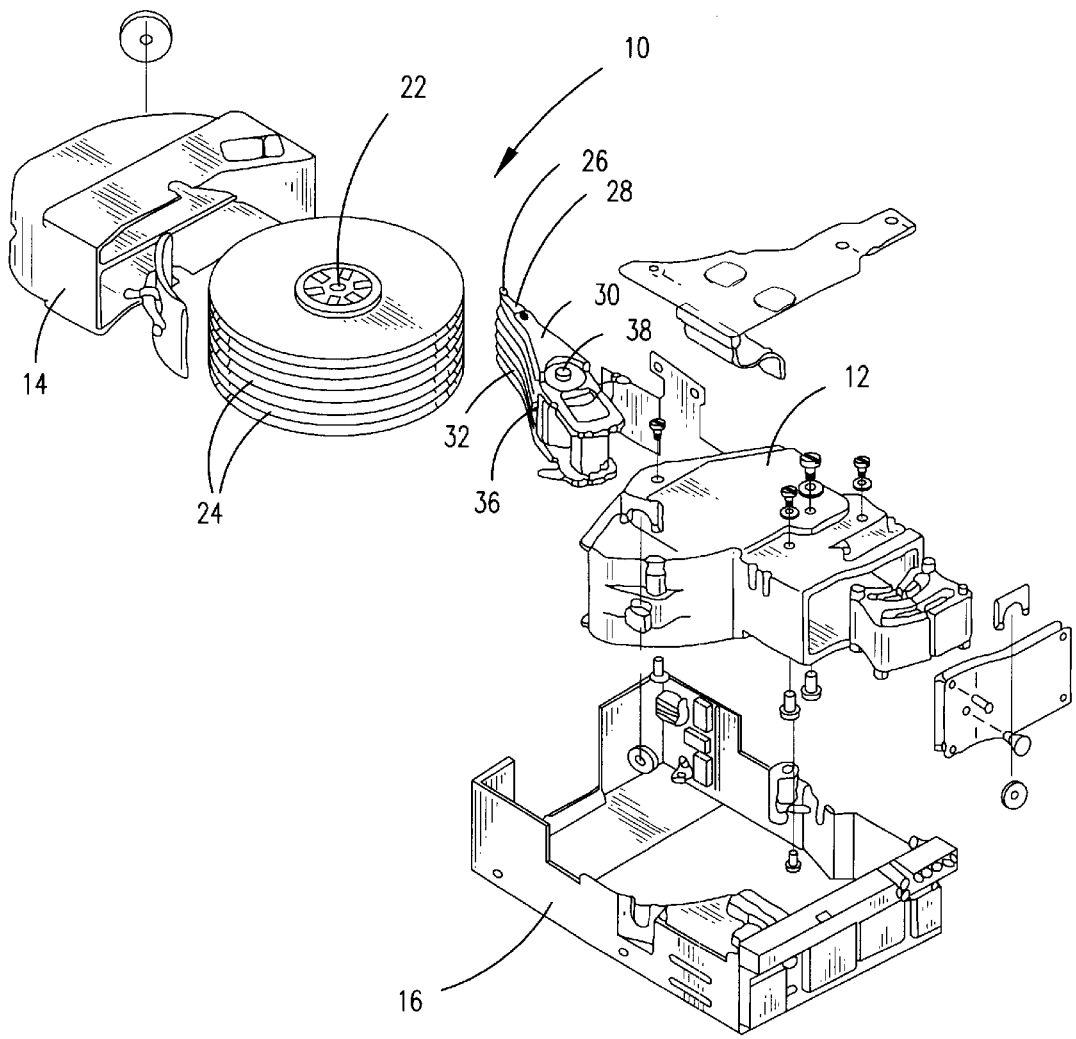
FIG. 1 is an exploded view of a magnetic storage device according to the present invention.

FIG. 1 illustrates an exploded view of a magnetic storage system 10. The disk drive 10 includes a housing 12 and a housing cover 14 which, after assembly, is mounted within a frame 16. Mounted within the housing is a spindle shaft 22. Rotatably attached to the spindle shaft 22 are a number of magnetic storage disks 24. In FIG. 1, eight disks 24 are attached to the spindle shaft 22 in spaced apart relation. The disks 24 rotate on spindle shaft 22 which is powered by a motor (not shown). Information is written on or read from the disks 24 by heads or magnetic transducers (not shown) which are supported by sliders 26. Preferably, sliders in accordance with the invention are coupled to the suspensions or load springs 28. The load springs 28 are attached to separate arms 30 on an E block or comb 32. The E block or comb 32 is attached at one end of an actuator arm assembly 36. The actuator arm assembly 36 is rotatably attached within the housing 12 on an aqtuator shaft 38. The rotary actuator assembly 36 moves the integrated transducer/suspension assembly in accordance with the present invention in an arcuate path across the surface of the storage disk 24. However, the invention is not meant to be limited to the disk drive described above. Those skilled in the art will recognize that adaptive calibrations based on real time performance monitoring according to the invention may be implemented with any configuration of disk drive or direct access storage device (DASD).

Figure 2:
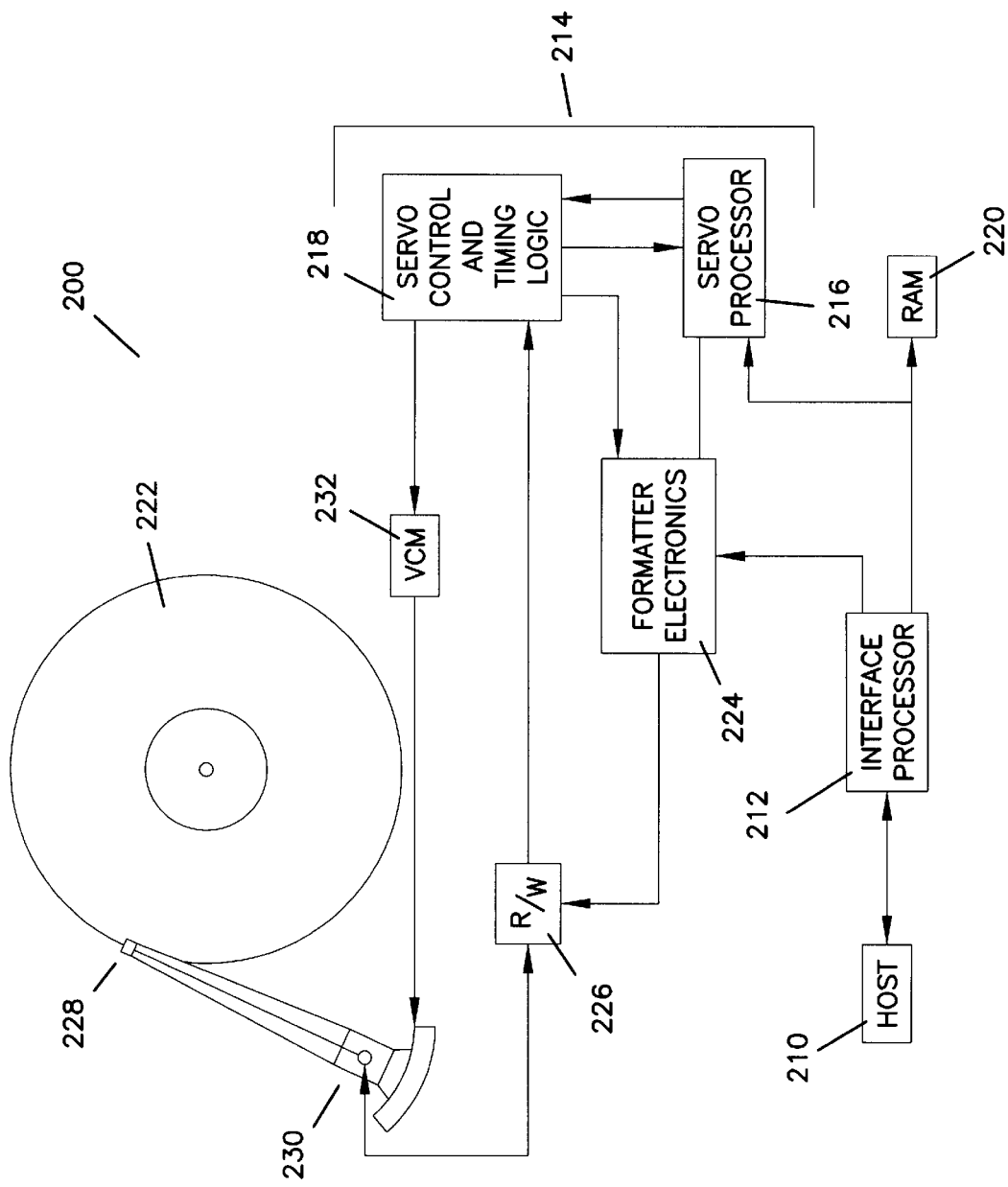
FIG. 2 illustrates a block diagram of a computer disk drive system in accordance with the invention.

FIG. 2 illustrates a block diagram of a computer disk drive system 200 suitable for practicing the invention. It shall be understood that the general read/write and servo functions of a disk drive are well-known in the art, and their particular implementation is not an aspect of the present invention unless expressly noted. A host computer system 210 is coupled to an interface processor 212 linking the host system 210 to a servo controller 214. The servo controller 214 includes a servo processor 216 and servo control and timing logic 218. Data parameters may be stored in random access memory (RAM) 220 or on the disk itself 222. The servo processor 216 is attached at the opposite end of the interface processor 212 and receives commands across the interface processor 212 from the host system 210.

Data to be written to the disk 222 is routed to the formatter electronics 224. The read/write circuit 226 conditions the data and routes the data to the head 228 at the end of the actuator arm 230 for writing to the disk 222. Data read from the disk 222 by the head or sensor 228 is received by the read/write circuit 226. The data received from the head 228 is conditioned by the read/write circuit 226 to provide a read pulse output. The read pulse output is then routed to the formatter electronics 224 for processing before being provided to the host 210 via the interface processor 212.

The servo processor 216 provides control signals to the servo control and timing logic 218. The servo control and timing logic 218 interprets the control signals from the servo processor 216 and sends voice coil control signals to the voice coil motor 232. The voice coil motor 232 drives the actuator arm 230 in accordance with the control signals. The actuator arm 230 supporting the magnetic head 228 is driven by the voice coil motor 232 to move the magnetic head 228 to a target track position on the disk 222. The servo control and timing logic 218 outputs to the servo processor 216 position data indicative of the track position corresponding to the current position of the magnetic head 228 from servo data read out from the disk 222.

Figure 3:
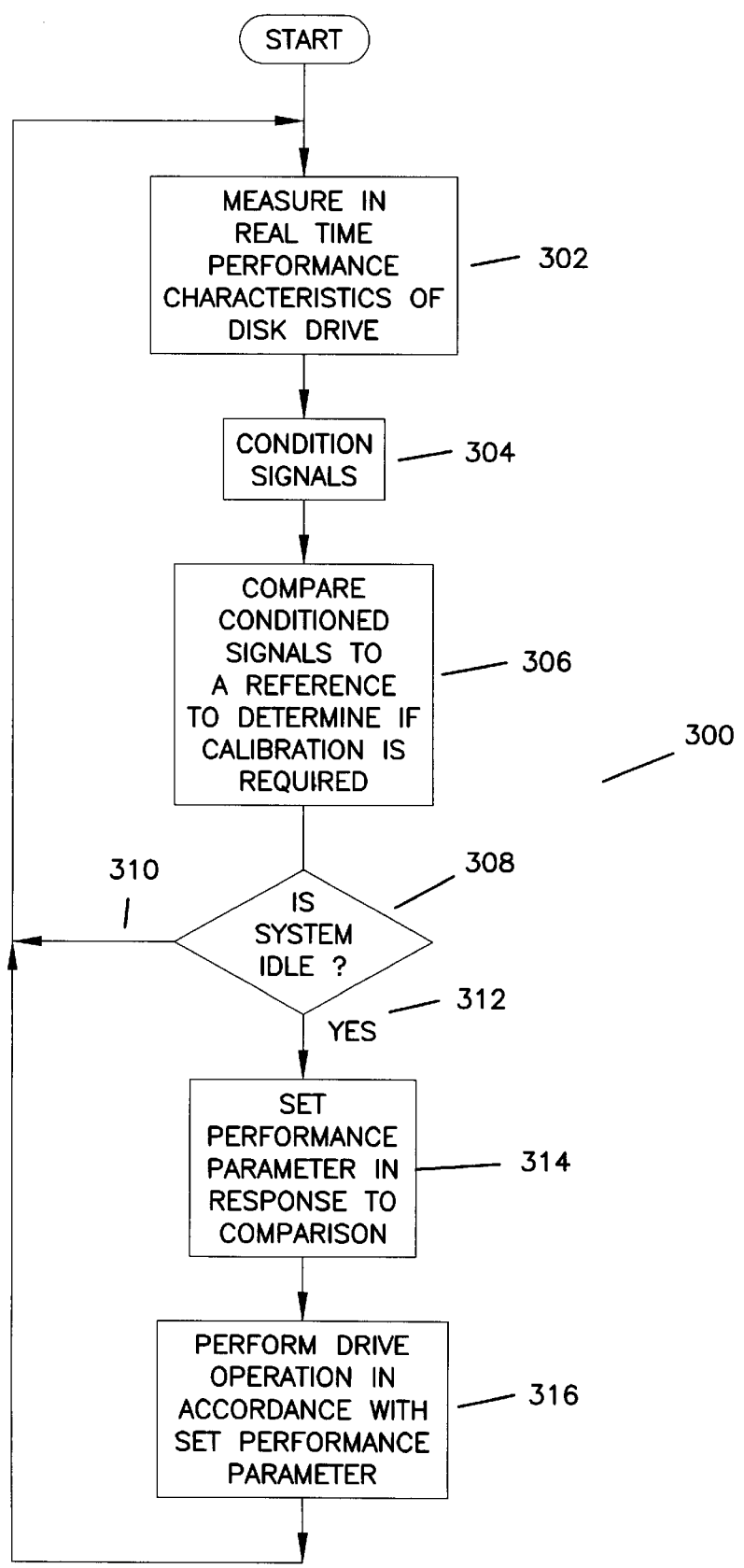
FIG. 3 illustrates a flow chart of the adaptive calibration method according to the present invention.

FIG. 3 illustrates a flow chart of the adaptive calibration method 300 according to the present invention. The system monitors one or more performance characteristics of the disk drive in real time 302. One such performance characteristic that may be measured is runout. Runout is the difference between the actual centerline of a track and the effective centerline presented to a head positioned a fixed distance from the mounting center of the disk. Runout may, for example, be caused by slight eccentricity in the mounting of the disk on its drive spindle. Runout from a drivers own spindle motor may be measured using the disk drive magnetic head or sensor so that an RRO cancellation control may be calculated to cancel the effect of the runout. The measured performance characteristic(s) may then be conditioned 304. For example, the measured signals may be filtered by a low pass filter to remove the high frequency components from the signal. However, those skilled in the art will recognize that other signal conditioning, or none at all, may be performed on the measured signals without departing from the teaching of the present invention.

After the measured signals are conditioned 304, a comparison between each measured signal and a reference value is performed 306, e.g., in microcode executed by the interface processor, or by dedicated hardware. Although disk drive calibration must be performed to meet the stringent demands of certain environments such as video-on-demand, the interruption of a data stream to perform such functions is undesirable. Accordingly, the comparison 306 determines whether calibration is necessary.

The system determines whether a data stream is in process 308. If a data stream is in process 310 (system not idle) and performance characteristics are in an acceptable operating range, calibration is determined to be unnecessary and will be delayed until at least the next scheduled measurement. However, if the measurement of performance characteristics are outside of design specifications for the performance parameters of the disk drive, a calibration is scheduled but execution is delayed until a data stream is not in process, i.e., the system is idle 312. Then, performance parameters stored, e.g., in memory or on the disk itself, are updated with the newly calibrated values in response to the comparison 314. For example, if the measured signal or performance characteristic (e.g., runout) is worse than the reference characteristic, then the stored performance parameter (i.e., RRO cancellation in this example) is replaced with a new performance parameter. Finally, the drive operations are carried out in accordance with the updated performance parameters 316.

Figure 4:
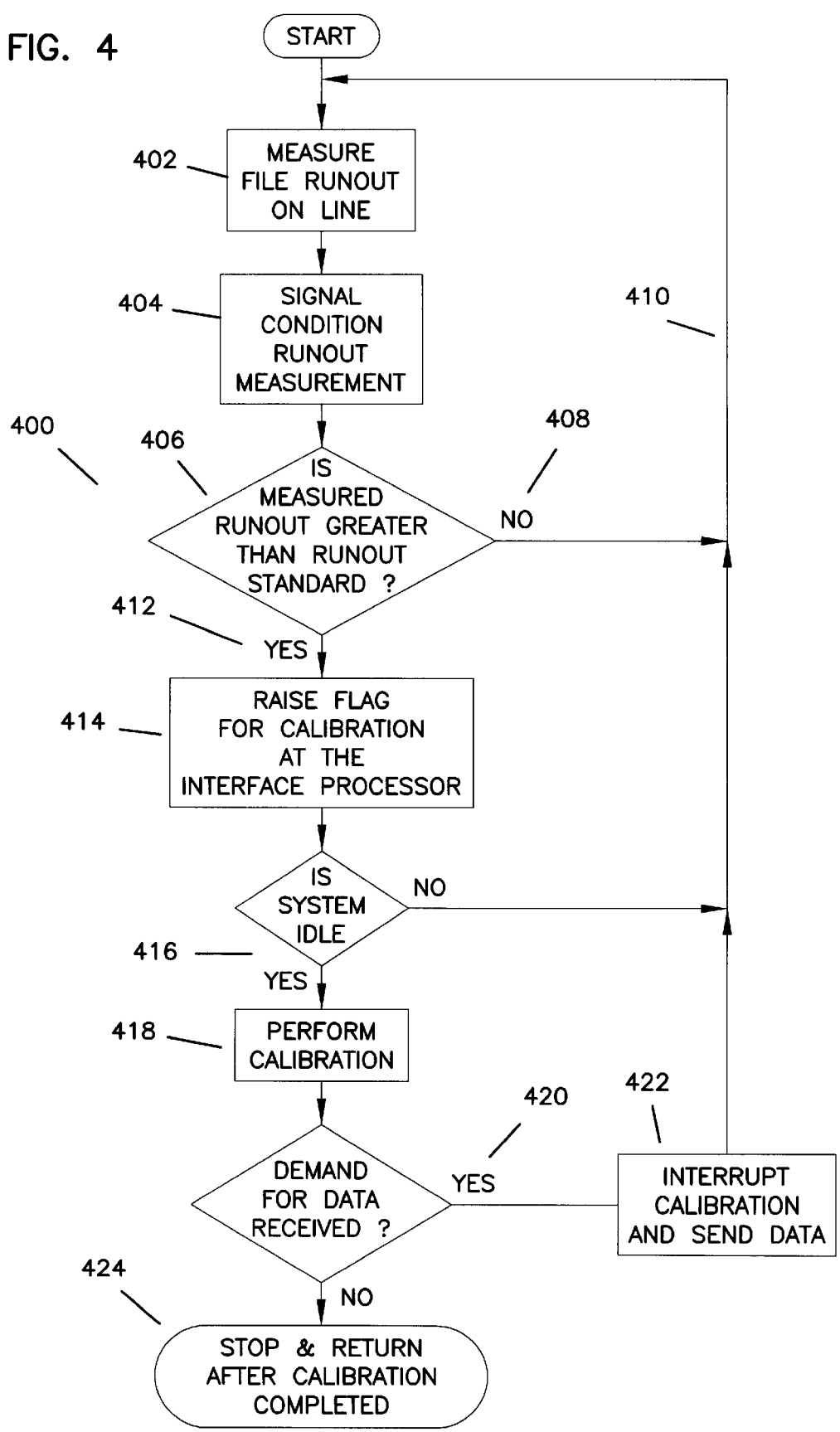
FIG. 4 illustrates a flow chart of the adaptive runout calibration according to the present invention.

FIG. 4 illustrates a flow chart of the adaptive calibration method of the present invention as applied to the specific case of runout calibrations. The file runout is measured online 402 as discussed above with reference to FIG. 3. The measured runout signal is then preferably conditioned 404. Next, the measured runout is compared to a predetermined runout reference 406. If the measured runout is not greater than the standard as shown is step 408, calibration is not performed and runout is measured online again 410 in the next scheduled measurement step. If runout is greater than the standard as shown in path 412, a flag is raised in the interface processor 414. When the system becomes idle 416, the flag will trigger calibration 418. If during calibration a demand for data is received 420, the calibration is interrupted and the requested data stream is initiated 422. Absent a demand for data, the calibration will proceed until completed 424. Thereafter, runout is monitored as previously described until it is again outside performance specification parameters.

Figure 5:
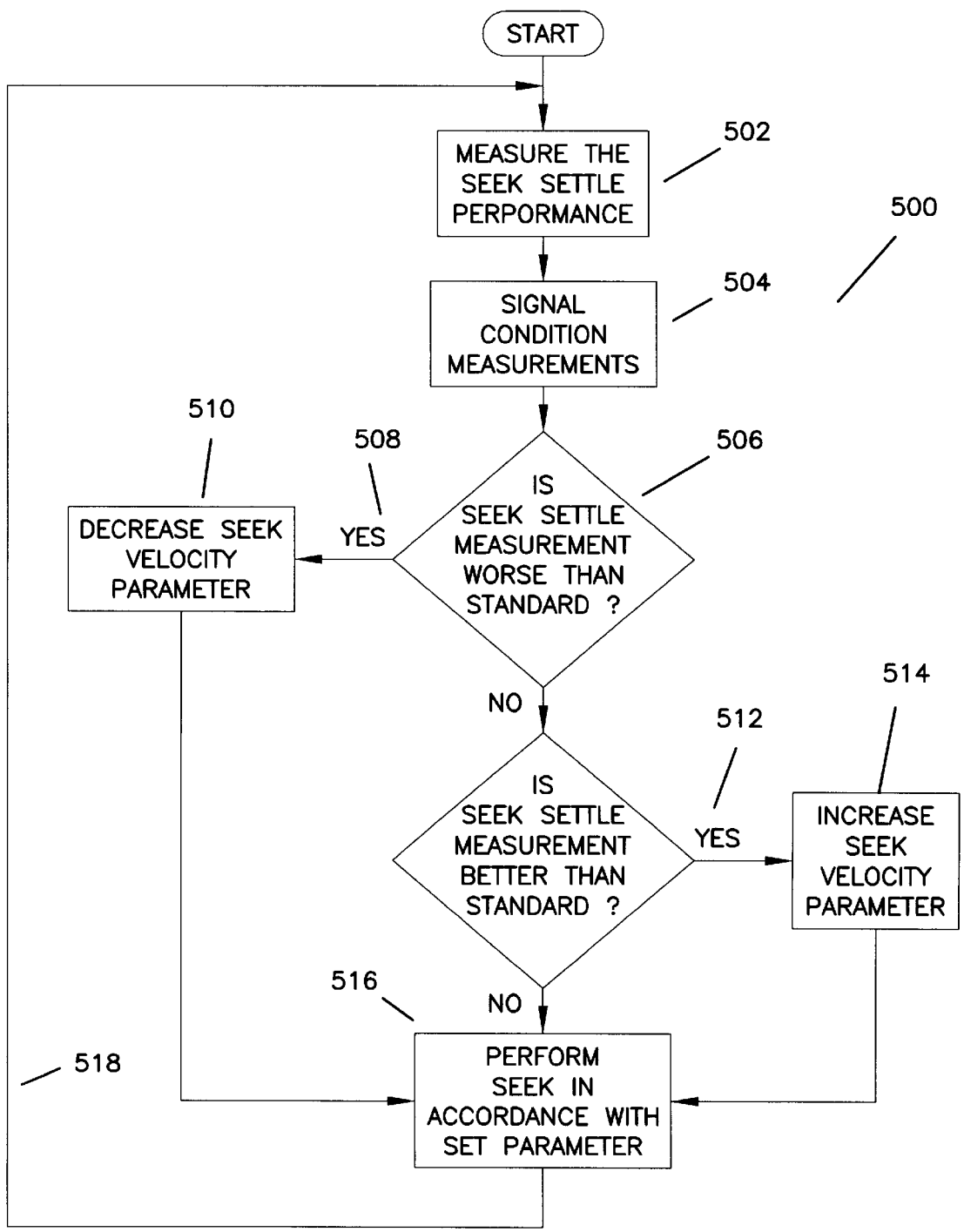
FIG. 5 illustrates a flow chart of the adaptive seek settle performance calibration according to the present invention.

FIG. 5 illustrates a flow chart 500 of the adaptive calibration method as applied to seek settle performance calibration. First, the seek settle performance is measured 502. For example, the controller instructs the drive to seek to a specified track address on the disk. Once the seek is completed, a signal is sent from the drive to the controller, for example, to indicate that the head has settled on the desired track. This time period is measured and stored as the seek settle measurement. Then, the measured performance is preferably conditioned 504.

After the measured seek settle performance has been conditioned 504, the conditioned signal is compared against a reference characteristic for the seek settle reference characteristic or value 506. If, the seek settle performance characteristic is worse than the reference characteristic 508, the seek velocity is decreased 510. If the seek settle performance characteristic is better than the reference characteristic 512, the seek velocity is increased 514. Nevertheless, after the comparison, and possibly after the parameter has been adjusted appropriately, seeks are performed in accordance with the set parameters 516. Thereafter, the seek settle performance is again monitored in real time for deviations from the acceptable range of seek settle values.

It should be readily apparent that additional calibrations performed in,a disk drive may be similarly adapted to the method of the present invention. In summary, a method and apparatus for adaptively calibrating disk drive performance based on real time performance monitoring has been disclosed. Those skilled in the art will recognize that the adaptive techniques according to the invention may be used to optimize performance characteristics such as seeking, tracking, shock and vibration sensitivity, along with many dynamic variables. Further, the adaptive calibration techniques ensure that the optimal seek velocity, acceleration profile, and deceleration profile are met and that mechanical disturbances including track runout, actuator bias forces, and quantization due to digital-to-analog and analog-to-digital conversions are within acceptable limits. With the above changes, the nominal design can be made to be more aggressive than before.

Nevertheless, the foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for performing calibration on a disk drive in real time, comprising:

a sensor for measuring a performance characteristic of a disk drive;

a memory, operatively coupled to the sensor, for storing a performance parameter and a reference characteristic; and a control circuit, operatively coupled to the sensor and memory, for comparing the measured performance characteristic to the reference characteristic, the performance parameter in the memory being replaced by the measured performance characteristic when the measured performance characteristic differs from the reference characteristic by a predetermined value, and wherein the control circuit performs a drive operation in accordance with the performance parameter stored in the memory.

2. The apparatus of claim 1 further comprising a signal conditioner for conditioning the measured performance characteristic.

3. The apparatus of claim 1 wherein the performance characteristic comprises disk runout.

4. The apparatus of claim 1 wherein the control circuit comprises a processor for comparing the measured performance characteristic to the reference characteristic and performing the drive operation in accordance with the performance parameter.

5. The apparatus of claim 4 wherein a calibration flag is set in the processor in response to the comparison of the measured performance characteristic to the reference characteristic.

6. The apparatus of claim 5 wherein the drive operation comprises calibration of disk runout during idle time.

7. The apparatus of claim 6 wherein the calibration is interrupted when a demand for data is received by the processor.

8. The apparatus of claim 7 wherein the processor issues a calibration command to a servo controller in response to the setting of the calibration flag.

9. The apparatus of claim 1 wherein a flag is set by the control circuit in response to the comparison of the measured performance characteristic to the reference characteristic.

10. The apparatus of claim 9 wherein the drive operation is interrupted when a demand for data is received by the processor.

11. The apparatus of claim 10 wherein the drive operation comprises calibration of disk runout during idle time.

12. The apparatus of claim 1 wherein the drive operation comprises calibration of a performance characteristic during idle time.

13. The apparatus of claim 1 wherein the performance characteristic comprises seek settle performance.

14. The apparatus of claim 13 wherein the performance parameter stored in the memory comprises a seek velocity, the seek velocity being adjusted in response to the comparison.

15. The apparatus of claim 14 wherein the seek velocity is decreased if the seek settle performance is worse than a minimum seek settle reference value and increased if the seek settle performance is better than a maximum seek settle reference value.

16. A method of performing calibration on a disk drive in real time, comprising the steps of:

measuring a performance characteristic of a disk drive;

comparing the measured performance characteristic to a reference characteristic;

replacing a performance parameter stored in a memory with the measured performance characteristic when the measured performance characteristics differs from the reference characteristic by a predetermined value; and performing a drive operation in accordance with the performance parameter stored in memory.

17. The method of claim 16 further comprising the step of conditioning the measured performance characteristic.

18. The method of claim 16 wherein the step of measuring the performance characteristic comprises the step of measuring disk runout.

19. The method of claim 18 wherein the step of updating a performance parameter further comprises the step of setting a calibration flag.

20. The method of claim 19 wherein the step of updating a performance parameter further comprises the step of calibrating the runout performance during idle time.

21. The method of claim 20 wherein the step of calibrating the runout performance is interrupted when a demand for data is received by the disk drive.

22. The method of claim 21 further comprising the step of issuing a calibration command in response to the setting of the calibration flag.

23. The method of claim 16 wherein the step of updating a performance parameter further comprises the step of setting a calibration flag.

24. The method of claim 23 wherein the step of updating a performance parameter further comprises the step of calibrating the runout performance during idle time.

25. The method of claim 24 wherein the step of calibrating the runout performance is interrupted when a demand for data is received by the disk drive.

26. The method of claim 16 wherein the step of updating a performance parameter further comprises the step of calibrating a performance characteristic during idle time.

27. The method of claim 16 wherein the step of measuring a performance characteristic comprises the step of measuring seek settle performance.

28. The method of claim 27 wherein the step of comparing the measured performance characteristic to the reference characteristic further comprises the steps of comparing the seek settle performance to a seek settle reference value and adjusting the seek velocity in response to the comparison.

29. The method of claim 28 wherein the step of adjusting the seek velocity in response to the comparison further comprises the steps of decreasing the seek velocity if the seek settle time is worse than a minimum seek settle reference value and increasing the seek velocity if the seek settle time is better than a maximum seek settle reference value.

30. A disk drive, comprising:

at least on e rotating disk for recording data thereon; a housing, the rotatable disk being rotatably attached to the housing;

an actuator arm assembly, coupled to the housing;

a sensor, coupled to the actuator arm, for measuring a performance characteristic of a disk drive;

a memory, operatively coupled to the sensor, for storing a performance parameter and a reference characteristic; and a control circuit, operatively coupled to the sensor and memory, for comparing the measured performance characteristic to the reference characteristic, the performance parameter in the memory being replaced by the measured performance characteristic when the measured performance characteristics differs from the reference characteristic by a predetermined value, and wherein the control circuit performs a drive operation in accordance with the performance parameter stored in the memory.

31. The disk drive of claim 30 further comprising a signal conditioner for conditioning the measured performance characteristic.

32. The disk drive of claim 30 wherein the performance characteristic comprises disk runout.

33. The disk drive of claim 30 wherein the control circuit comprises a processor for comparing the measured performance characteristic to the reference characteristic and performing the drive operation in accordance with the performance parameter.

34. The disk drive of claim 33 wherein a calibration flag is set in the processor in response to the comparison of the measured performance characteristic to the reference characteristic.

35. The disk drive of claim 34 wherein the calibration is interrupted when a demand for data is received by the processor.

36. The disk drive of claim 35 wherein the processor issues a calibration command to a servo controller in response to the setting of the calibration flag.

37. The disk drive of claim 34 wherein the drive operation comprises calibration of disk runout during idle time.

38. The disk drive of claim 30 wherein a flag is set by the control circuit in response to the comparison of the measured performance characteristic to the reference characteristic.

39. The disk drive of claim 38 wherein the drive operation is interrupted when a demand for data is received by the processor.

40. The disk drive of claim 39 wherein the drive operation comprises calibration of disk runout during idle time.

41. The disk drive of claim 30 wherein the drive operation comprises calibration of disk runout during idle time.

42. The disk drive of claim 30 wherein the performance characteristic comprises seek settle performance.

43. The disk drive of claim 42 wherein the performance parameter stored in the memory comprise a seek velocity, the seek velocity being adjusted in response to the comparison.

44. The disk drive of claim 43 wherein the seek velocity is decreased if the seek settle performance is worse than a minimum seek settle reference value and increased if the seek settle performance is better than a maximum seek settle reference value.

* * * * *

UNITED STATES PATENT AND TRADEMARK OFFICE
CERTIFICATE OF CORRECTION

PATENT NO. : 5,880,902  
DATED : March 9, 1999  
INVENTOR(S) : Yu et al.

It is certified that error appears in the above-identified patent and that said Letters Patent is hereby corrected as shown below:

Column 4,  
Line 64, after "runout." please make a new paragraph starting with "The measured";

Column 7,  
Line 3, please replace "claim 6" with -- claim 5 --;

Column 8,  
Line 24, please replace "on e" with -- one --.

Signed and Sealed this

Twenty-eighth Day of May, 2002

Attest:

JAMES E. ROGAN  
*Attesting Officer*     *Director of the United States Patent and Trademark Office*